United States Patent [19]

Rand

[11] Patent Number: 5,098,100

[45] Date of Patent: Mar. 24, 1992

[54] VIDEO GAME CONTROL ATTACHMENT

[76] Inventor: Keith D. Rand, 26 W 261 Burdette, Carol Stream, Ill. 60188

[21] Appl. No.: 653,307

[22] Filed: Feb. 11, 1991

[51] Int. Cl.$^5$ .............................................. A63B 71/04
[52] U.S. Cl. ................................................. 273/148 B
[58] Field of Search ................. 273/148 B; 400/473, 400/474, 475

[56] References Cited

U.S. PATENT DOCUMENTS

| 4,265,557 | 5/1981 | Runge | 400/473 |
| 4,297,044 | 10/1981 | Hornberg et al. | 400/473 |
| 4,687,200 | 8/1987 | Shirai | 273/148 B |

FOREIGN PATENT DOCUMENTS

| 1158381 | 5/1985 | U.S.S.R. | 400/473 |

OTHER PUBLICATIONS

"Spreadable Pattern Impact Tester", R. L. Bellamy, IBM Technical Disclosure Bulletin, vol. 25, No. 7A, Dec. 1982.

Primary Examiner—Edward M. Coven
Assistant Examiner—Raleigh W. Chiu
Attorney, Agent, or Firm—Paul H. Gallagher

[57] ABSTRACT

A block, as of molded plastic, having a recess in which is mounted the standard control of a TV game, that standard control having push buttons for controlling the game displayed on the TV screen. Levers are mounted in the block, and wheel manually rotated for rocking the levers; the levers repeatedly depress the push buttons.

10 Claims, 2 Drawing Sheets

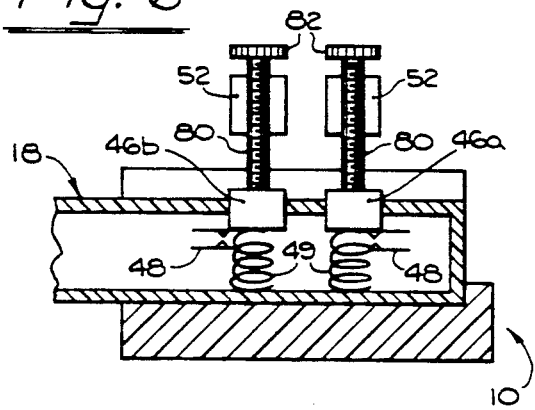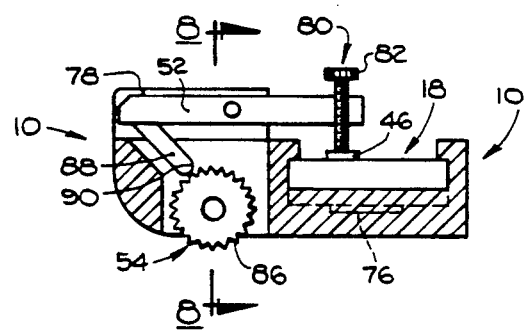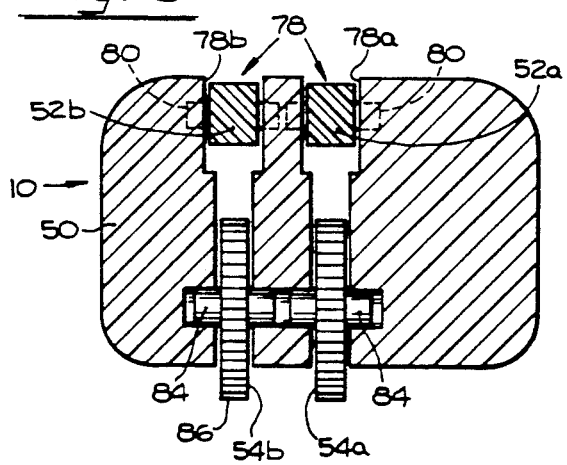

1

VIDEO GAME CONTROL ATTACHMENT

FIELD OF THE INVENTION

The present invention resides in the field of video games, or TV games, which include a unit applied to a TV set. A cassette is placed in the unit, and it has a game recorded thereon that is projected or displayed on the TV screen. The unit includes a standard control which the user manipulates to control the game displayed on the screen, by varying the elements making up the game, such as in location, speed of movement, etc. The standard control of the unit includes control keys or push buttons manually manipulated by the user for so controlling the game displayed. In the use of the unit or component, the push buttons are depressed repeatedly, and a principal feature of such a device is that the control of the game is best effected by the rapid depression of the push buttons. This kind of TV game generally is known.

SUMMARY OF THE INVENTION

The device of the present invention is an attachment that is applied to or clipped on the standard control of the TV game referred to.

A principal feature of the invention is that in the use of the clip on control, the control keys or push buttons in the standard control can be actuated more rapidly and more easily than without it, and it produces a much greater effect in the control of the game displayed.

Another important feature of the invention is that the clip on control can be applied to the standard control without in any way altering the standard control.

Another feature and advantage of the device of the invention is that it is of extremely simple construction, and is entirely mechanical in its nature and functioning, and nevertheless adaptable to the standard control which contains electrical components.

Another advantage is that the device is extremely strong and rugged, and withstands any accidental intensive use or abuse, and will not adversely affect the standard control to which it is clipped on.

Still another advantage is that even if it is desired to utilize the standard control according to its own nature, when the clip on control is applied thereto, the standard control can be manipulated according to its own nature even with the clip on control applied thereto.

BRIEF DESCRIPTION OF THE SEVERAL VIEWS OF THE DRAWINGS

FIG. 6 is a sectional view taken at line 6—6 of FIG. 4.

FIG. 7 is taken at line 7—7 of FIG. 4.

FIG. 8 is a view taken at line 8—8 of FIG. 7.

DETAILED DESCRIPTION

Figure 1:
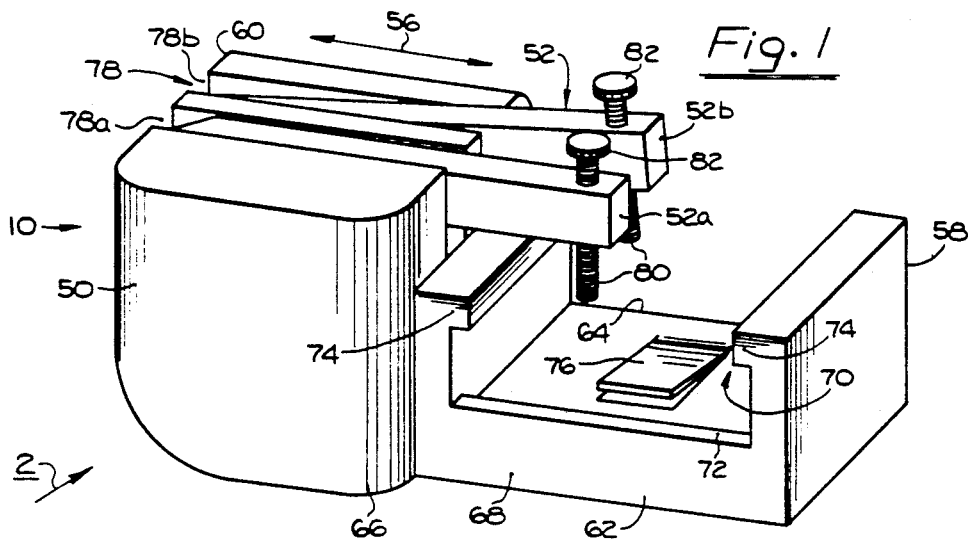
FIG. 1 is a perspective view of the device of the present invention.
Figure 2:
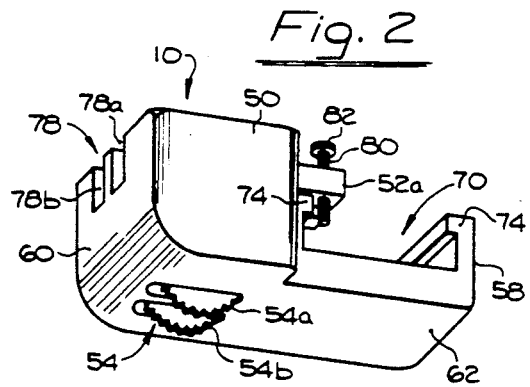
FIG. 2 is a perspective view taken approximately in the direction of the arrow 2 in FIG. 1.

The device of the present invention is shown in its entirety at 10 and shown in perspective views in FIGS. 1 and 2. The device is to be added on to an original manual control of the TV game, but for convenience it may be referred to as a clip on control, or power clip control.

Figure 3:
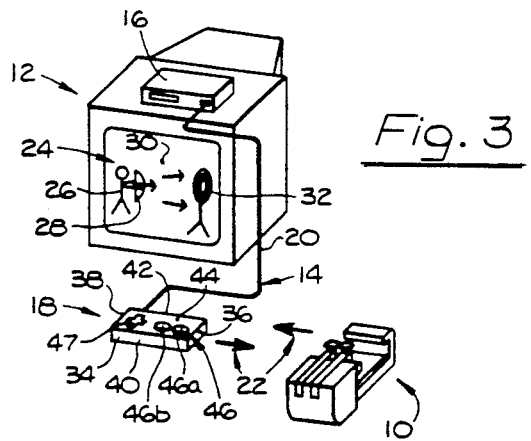
FIG. 3 is a perspective view of a TV set with the TV game component applied thereto, in association with the clip-on control of the present invention.

For convenience, a detail description is made first to the TV set having the TV game, which is a separate unit, applied thereto. The TV set itself is indicated at 12, and the TV game, or game unit is indicated at 14, this unit including, as original components, a unit, 16 applied directly to the set, a manual control 18, and a conductor 20 interconnecting those two members 16,18. The clip on control 10 is also shown in FIG. 3, positioned for clipping onto the original manual control 18 as indicated by the arrows 22.

By means of the game unit 14, a game is displayed on the screen of the TV as indicated at 24, such games being known, as Indicated above, and these games are of course animated and they are controlled by the user who manipulates the manual control 18. There is practically an endless variety of such games, but the game 24 shown here, which is a random selection, is an archery game. The game shows the archer 26 having a bow 28, and arrows 30 flying to the target 32.

In operating or controlling the game, as referred to again hereinbelow, the arrows are made to t ravel faster, or slower, higher, or lower, etc., and the manual control 18 is manipulated for that purpose.

The manual control 18 is a complete and self-contained component which in its normal operation and according to its inherent character, and upon manual manipulation, it is operable for controlling the game displayed on the screen. The clip on device of the present invention is merely clipped onto the manual control, and the latter is manipulated in the intended manner through the clip on device.

The manual standard control 18 is in the shape of a small box 34 having an entrance end 36, an opposite end 38, a front side 40, and a rear side 42, and a top side or surface 44.

The game unit 14 shown here is a NINTENDO item, a TV game including a unit applied to a TV set, although the device of the invention can be used with such components of other brands. In this case, the manual control 18 is provided with control keys 46, individually identified 46a, 46a, and another control key 47, The control keys 46 are depressed in the ordinary and intended manner of operating the standard control according to its own nature. The clip on control of the present invention actuates these control keys 46, but the control key 47 is left exposed and not affected by the clip on control.

The control keys 46, upon being depressed, actuate switch elements 48 (FIG. 6) and upon being released they are biased upwardly by compression springs 49, this representation being only diagrammatic. For convenience these keys are referred to as having retracted inactive positions and advanced active positions. According to the nature of the TV game, the control of the game displayed is effected by repeated depressions of the control keys, and the more rapidly they are actuated, the greater is the effect in the control of the game. The factors affecting the control of the game may include increasing or decreasing the power, for example, as well as varying other factors.

Reference is now made to the specific construction of the clip on control of the present invention. The clip on control includes a block 50, a pair of levers 52, individually identified 52a, 52b, and a pair of star wheels 54, individually identified 54a, 54b. For convenience in identifying the various elements, and their orientation, the block is stated as having a longitudinal direction indicated by the double-headed arrow 56, a front end 58, a rear end 60, a right side 62, and a left side 64.

The block 10 has a rear portion 66 of substantial height, forming a hand-gripping portion, and a lower front portion 68, the latter being also narrower than the rear portion, for convenience.

Formed in the lower front portion is a recess 70 opening upwardly, having a ledge or bead 72 at the right-hand side, and opposed, inwardly turned limit stops 74 at the top of the recess. Also a yieldable tongue 76 is formed preferable integral with the floor of the recess and projecting above the normal surface of the floor, and being yieldable for biasing the control 18 upwardly as referred to again hereinbelow.

The block 50 has a pair of longitudinally extending slots 78, individually identified 78a, 78b, spaced apart transversely and extending through the bottom of the block, and they may also extend through the top of the block.

The block including the elements thereof above described, is preferably in the form of molded plastic, and is integral, one piece, or effectively so.

Figure 4:
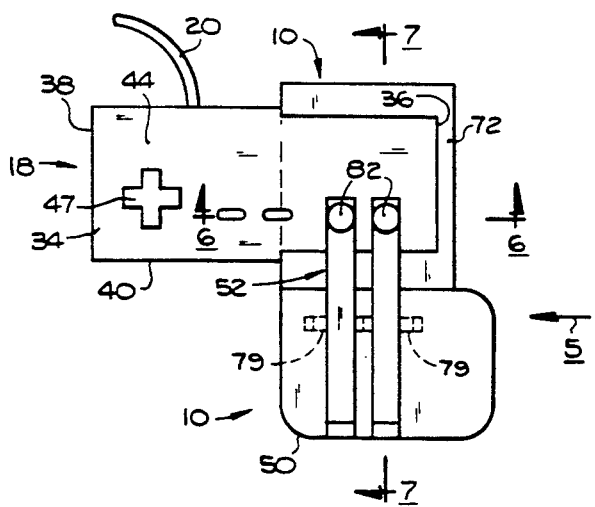
FIG. 4 is a top view of the device with the standard control mounted therein.

The levers 52 are pivoted in respective slots 78 (FIG. 4) in a suitable manner such as by means of shafts or axles 79 intermediate their ends. The levers are preferably also of plastic and the shafts may be integral with the main part of the lever, or separate elements as desired. They are imbedded in the body of the block as referred to hereinbelow, and the elements are so dimensioned that the levers are free to pivot, rock, reciprocate on the shafts 80 except as confined as described hereinbelow.

The front ends of the levers 52 extend forwardly from the rear portion 66 of the block and over the recess 70. In the front ends of the levers are threaded pins or stems 80 similar to set screws, threaded vertically in holes in the levers and having at their upper ends enlarged knurled heads 82 for gripping by the fingers for adjusting them vertically. Preferably the heads 82 are painted a distinctive color, such as red to correspond with the control keys 46 (FIG. 3) which are normally colored, e.g. red. The heads 82 in addition to being used for gripping and turning, also may be depressed manually for actuating the control keys in the standard control, as referred to herein below.

The star wheels 54 (FIG. 2, 5) are also mounted in the slots 78, and they are so mounted as to extend through the slots downwardly, for access for manipulating them. The star wheels are provided with shafts or axles 84 which may be integral with the star wheels, or separate, as desired, and imbedded in the material of the block. These star wheels are in the shape of gears having teeth 66 FIG. 7, and are rotated for manipulating the levers. For this purpose the levers have extensions 88 engaging the star wheels, with rounded ends 90 directly engaging the wheels to enable the extensions to pass easily over the individual teeth.

The levers and wheels may be mounted in the block in a known manner; the block may be molded in halves, for example, and the levers and wheels fitted in place in the halves, and then the halves put together, forming an effectively integral one-piece whole of the block. FIG. 8 shows the preferred dimensions of the slots 78 and the levers and wheels. It is desired of course that the levers rock or reciprocate easily, and that the wheels rotate easily, but without undue play between the elements. The slots may for example be 0.250" in width, and the levers and wheels being approximately 0.240" in thickness, these dimensions of course being merely examples.

Figure 5:
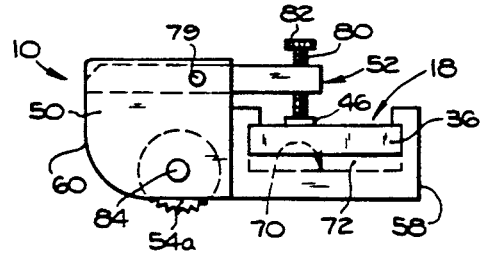
FIG. 5 is a side view taken in the direction of the arrow 5 in FIG. 4.

In using the clip on control, or power clip control, of the invention (FIG. 3), the block 10 is applied to the manual control 18 by inserting the entrance end 36 of the latter into the recess 70, from the left. The standard control engages the limit stop 72 (FIG. 4) and in this position, the control keys 46 are directly under or in register with the front ends of the levers 52 (FIG. 5), but the control key 47 remains outside the recess and exposed relative to the clip on control. As indicated above, the control key 47 is manipulated for such maneuvers as locating the picture as a whole on the TV screen, while the control keys 46 manipulate the elements within the picture. In the use and manipulation of the manual control 18, without the device of the present invention, the control key 47 may be manipulated by the left hand for example and the other control keys 46 manipulated by the right hand. In the use of the device of the present invention, when applied to the manual control, the user still manipulates the control key 47 as before, but for manipulating the control keys 46 he uses the clip on control.

When the manual control 18 is inserted in the recess 70, and with the front ends of the levers raised and the extensions 88 (FIG. 7) in engagement with the wheels, the pins or set screws 80 are threaded down until they barely touch the control keys 46 (FIGS. 5, 7), but the control keys are not depressed in this step, at least not significantly. In the use of the clip on control as thus applied to the manual control 18, the user, to manipulate the control keys 46, and for the moment disregarding the control key 47, turns the wheels 54 singly, independent of each other, but also possibly in unison, for actuating the levers, and thereby actuating the control keys 46. In so rotating the wheels, the ends 90 of the projections 88 ride over the individual teeth and fall into the notches between the teeth. When the end 90 engages an individual tooth, the lever is rocked and the forward end of the lever is swung downwardly, depressing the corresponding control key 46 so that the latter performs its function. As each tooth rides by the end 90, it again falls into the next notch, and the lever is thereby rocked in the opposite direction, counterclockwise, FIG. 7, by the action of the control key being raised by the compression spring.

Such a step is repeated by each tooth of the wheel so that the control key 46 is depressed each time a single tooth of the wheel engages the end element 90. The wheel can be rotated extremely rapidly by engaging it by the finger and moving the hand rapidly and thereby rotating the wheel rapidly, this being done by the single movement of the hand in a single direction. In this single aspect of movement, the control key 46 is depressed repeatedly according to the nature of the intended operation of the manual control itself, and thus the clip on control of the present invention enables the control key to be depressed, and repeatedly so, extremely rapidly and many times in practically only an instant of time.

It is also possible to move or brush the device over the leg, with the wheels engaging the leg, and this movement can be extremely fast, with correspondingly much greater speed of movement of the control keys 46 repeatedly, in directions, i.e. each movement in one direction producing an electrical impulse in both the control of the unit.

A great advantage of the device is that it eliminates fatigue in the user's hand that previously resulted from repeated and fast tapping the keys 46 with the hand. In the straight movement of the hand in rotating the star wheels 54, or by rubbing the star wheels on the leg, there is no such fatigue.

I claim:

1. An added control device for applying to and controlling an original manual control for a TV set, the original manual control having the following characteristics, it is in itself complete and self-contained and operable for controlling the TV set according to its own design and purpose, it has at least one control key movable between a retracted inactive position and an advanced active position, and means yieldably retaining it in its retracted position, said added control device comprising, a block having a forward and a rearward direction and having a recess adapted for positioning the original manual control therein, the recess having a floor, the block, when the original manual control is positioned in the recess, completely holding and supporting and movably carrying the original manual control, a lever for each key pivoted in the block having a forward end engaging the control key, and having a rear end, and manual actuating means operable for repeatedly moving the lever, and thereby moving the key, in response to moving the actuating means a single time in a single direction.

2. A device according to claim 1 wherein, the manual actuating means includes a rotatable star wheel.

3. A device according to claim 1 wherein the original manual control has an entrance end, and the control key is located at a predetermined distance from the entrance end, and wherein, the block includes an end limit stop engageable by the entrance end of the original manual control, in the movement of the original manual control into said recess, and when it so engages it, said control key is operably positioned relative to said lever.

4. A device according to claim 3 wherein, the block has an upper side, and has side limit stops engaged by the original manual control when the original manual control is in the recess, and the floor of the recess has an integral element yieldably biasing the original manual control upwardly against said side limit stops.

5. A device according to claim 1, wherein the original manual control has a pair of control keys, and wherein, said device includes a pair of levers positioned in operable relation to the control keys respectively, and manually actuated star wheels operable for moving respective levers, each lever and corresponding star wheel being operable independently of the other.

6. A device according to claim 1 wherein each control key is depressed to move it to active position, and wherein, each lever has a front end effectively engageable with the key and is limited in movement in corresponding direction by that engagement, each lever at its rear end having effective engagement with the corresponding manual actuating means, and the levers being otherwise unrestrained in pivoting movement, whereby each lever can be independently depressed manually for depressing the corresponding control key, thereby enabling actuating the control keys in the same manner when the original manual control is positioned in the recess as when it is not in the recess and manipulated manually directly.

7. A device according to claim 1 wherein, the block is made up of a one-piece article, and the levers and manual actuating means are mechanically separate from the block and capable of being moved freely relative to the block and independently of each other.

8. A device according to claim 1 wherein, the original manual control includes internal electrical elements and the control keys control the electrical elements, and the control keys have portions extended to the exterior and forming mechanical elements, and wherein, said device is entirely mechanical in nature and performs its characteristic functions solely by engaging and moving the control keys independently of the electrical elements.

9. A device for applying to and controlling an original manual control having a pair of control keys movable between a retracted inactive position and an advanced active positive, and means yieldably retaining the control keys in their retracted position, the original manual control also having an entrance end and an upper side, said control keys projecting upwardly through the upper side of the original manual control and spaced apart along a line leading from the entrance end, said device comprising, a one-piece block having a forward and rearward direction and having a lower front portion and a rear hand-gripping portion, the block having an upwardly facing recess in its said lower front portion, for receiving the entrance end of the original manual control in direction transversely of the block, the recess having a floor, the block having an end limit stop engaged by the entrance end of the original manual control when the latter is in the recess, the block also having side limit stops at opposite sides of the recess relative to each other, engaged by the upper side surface of the original manual control, the block having an integral tongue in the floor of the recess yieldably biasing the original manual control upwardly against the side limit stops, the block having a pair of vertical slots in its rear portion, opening through at least the bottom of the block, levers in the upper portion of the slots pivoted intermediate their ends and thereby having front ends extending into the recess, and rear ends, the levers being positioned in register with the control keys and having vertically adjustable screws engageable with the corresponding control keys, and star wheels in the slots extending downwardly through the slots to the exterior for manual manipulation, the levers at their rear ends engaging the star wheels, and the star wheels thereby being operable on rotation thereof for reciprocating the levers.

10. A method of operating an original manual control having control keys operable for performing control functions in response to reciprocation thereof in opposite directions, comprising the step, providing manually actuable control means operable for so reciprocating the control keys in response to a single movement of the hand in a single direction.

* * * * *